US007041899B2

(12) United States Patent
Stekelenburg

(10) Patent No.: US 7,041,899 B2
(45) Date of Patent: May 9, 2006

(54) OUTDOOR ELECTRICAL OUTLET STAND WITH CONTROL DEVICE

(76) Inventor: Albert Stekelenburg, 9thFl., 102 Kuang-Fu S. Rd., Taipei (TW)

( * ) Notice: Subject to any disclaimer, the term of this patent is extended or adjusted under 35 U.S.C. 154(b) by 0 days.

(21) Appl. No.: 10/920,338

(22) Filed: Aug. 18, 2004

(65) Prior Publication Data

US 2006/0037769 A1 Feb. 23, 2006

(51) Int. Cl.
*H02G 3/08* (2006.01)

(52) U.S. Cl. ............................ 174/50; 174/53; 174/58; 220/3.2; 220/3.8; 362/95

(58) Field of Classification Search .................. 174/50, 174/53, 58, 57, 17 R, 48, 61, 63, 67; 220/3.2, 220/3.3, 3.4, 3.5, 3.6, 3.7, 3.8, 4.02, 242; 248/906, 156; 439/502, 640, 542, 505; 361/641; 362/95, 267

See application file for complete search history.

(56) References Cited

U.S. PATENT DOCUMENTS

| | | | | | |
|---|---|---|---|---|---|
| 3,104,064 | A | * | 9/1963 | Belleck | 362/267 |
| 4,523,263 | A | * | 6/1985 | Poyer | 362/267 |
| 5,062,028 | A | * | 10/1991 | Frost et al. | 362/183 |
| 5,649,760 | A | * | 7/1997 | Beadle | 362/267 |
| 5,879,184 | A | * | 3/1999 | Lopez | 439/502 |
| 6,087,780 | A | * | 7/2000 | Benny | 439/502 |
| 6,160,353 | A | * | 12/2000 | Mancuso | 315/159 |
| 6,273,578 | B1 | * | 8/2001 | Lai | 174/58 |
| 6,296,522 | B1 | * | 10/2001 | Ho | 439/640 |
| 6,300,570 | B1 | * | 10/2001 | Lai | 174/67 |
| D453,732 | S | * | 2/2002 | Stekelenburg | D13/139.4 |
| 6,752,362 | B1 | * | 6/2004 | Gretz | 248/156 |

* cited by examiner

*Primary Examiner*—Angel R. Estrada
(74) *Attorney, Agent, or Firm*—Troxell Law Office, PLLC

(57) ABSTRACT

An outdoor electrical outlet stand with a control device including a housing, a support, at least one outlet, and a control device. The control device is one of a timer module and a light module. The control device is electrically connected to a power supply and each of the at least one outlet. The control device controls power supplied to the at least one outlet to selectively provide power to appliances connected to each of the at least one outlet.

14 Claims, 2 Drawing Sheets

OUTDOOR ELECTRICAL OUTLET STAND WITH CONTROL DEVICE

FIELD OF THE INVENTION

The present invention relates generally to the field of outdoor electrical outlets and, more particularly, to an outdoor electrical outlet having a control device located therein, a stand for supporting and anchoring the electrical outlet and a housing that is waterproof and dustproofs.

BACKGROUND OF THE INVENTION

Outdoor power outlets that are used for garden or yard applications according to the prior art have at least one electrical outlet. Outdoor outlets are typically positioned in a garden or yard regardless of weather conditions including rain, snow or sun. According to the prior art, the outdoor electrical power outlets do not prevent dust or water from intruding into the outlet, which could result in a short circuit that could be dangerous or cause damage. The conventional outdoor power outlet does not include a control device that controls the power outlet by turning on and off electrical power to the power outlet at a predetermined time. Therefore, an outdoor electrical power outlet with a cover, and a control device is needed for protecting the user who uses the electrical power outlets outdoor.

SUMMARY OF THE INVENTION

It is an object of the present invention to provide an outlet with a support for protecting the outlet and providing safety from short circuits.

In accordance with one embodiment of the invention, an electrical outlet stand includes: a housing, a support, a plurality of electrical outlets, and a control device. The housing has a upper housing, and a lower housing including a first opening and at least one second opening. The upper housing is located over the lower housing to form an interior within the housing. The support is coupled to the lower housing through the first opening for anchoring the electrical outlet stand in a predetermined location. The support includes a third opening located in one side through which wires can be connected to the control device and the electrical outlets. The control device can include a timer module or a dusk to dawn photo switch that turns on at dusk and off a dawn. The plurality of electrical outlet are positioned in the interior of the housing above the second opening. Each of the plurality of outlets includes a outlet base, a first contact portion, a second contact portion and an outlet cover. The outlet cover is positioned to extend outwardly from the outlet base and be accessible from an exterior of the second opening of the housing. The outlet cover is flexibly connected at a first end to a first end of the outlet base and removably connected at a second end to a second end of the outlet base. The control device is positioned within the interior of the housing and electrically connected to each of the plurality of outlets for turning off and on electrical power to the outlets. The wire can be inserted through the third opening and the first opening, and electrically connected the control device that is electrically connected to the first and second contact portions of the electrical outlets to conduct power to the outlets. Appliance plugs can be inserted into the electrical outlets to receive power.

BRIEF DESCRIPTION OF THE DRAWINGS

The novel features believed characteristic of the invention are set forth with particularity in the appended claims. The invention itself, however, as well as a preferred mode of use, further objectives and advantages thereof, will be best understood by reference to the following detailed description when read in, conjunction with the accompanying drawings.

FIG. 1(*b*) is a side view of an electrical outlet stand with a control device according to the present invention.

FIG. 1(*c*) is a bottom view of an electrical outlet stand with a control device according to the present invention.

FIG. 1(*d*) is a top view of an electrical outlet stand with a control device according to the present invention.

DETAILED DESCRIPTION OF THE PREFERRED EMBODIMENTS

Figure 1D:
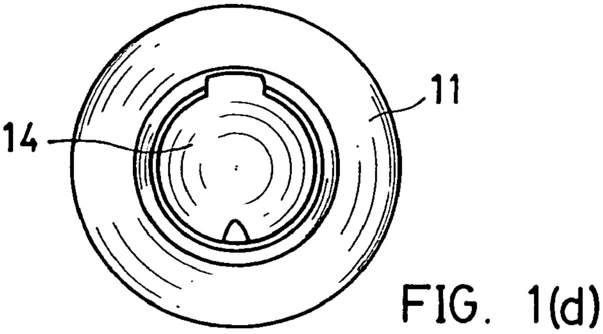
FIG. 1(*a*) is a front view of an electrical outlet stand with a control device according to the present invention.
Figure 1A:
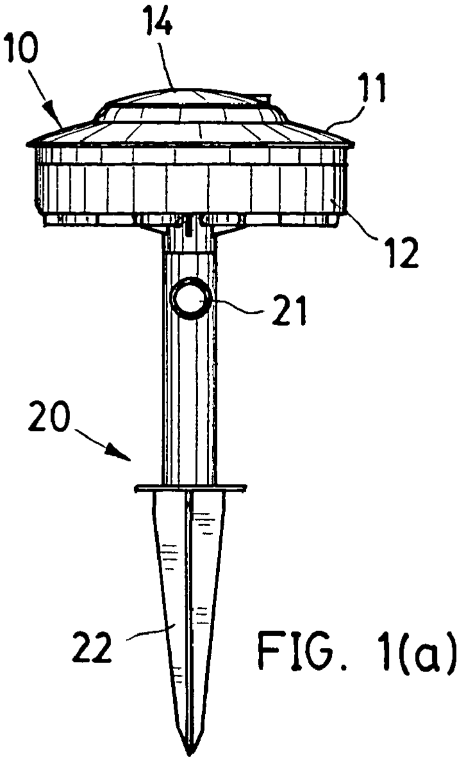
Figure 1B:
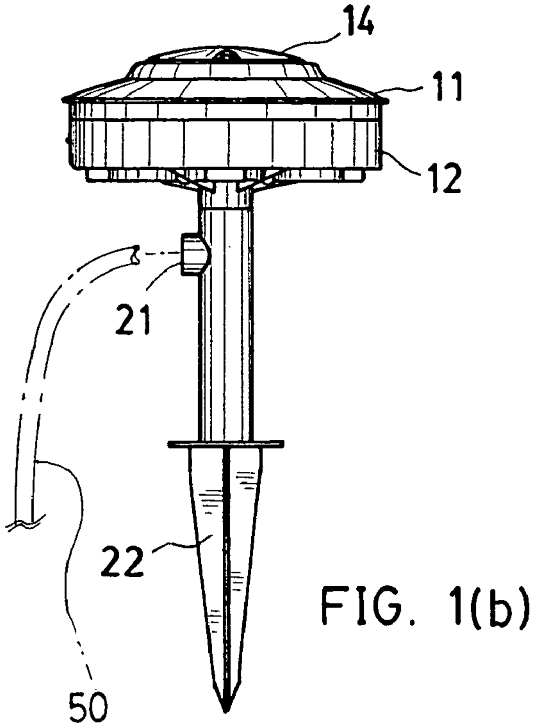
Figure 1C:
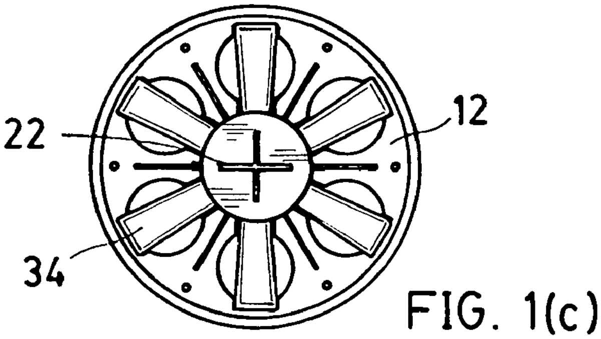
Figure 2A:
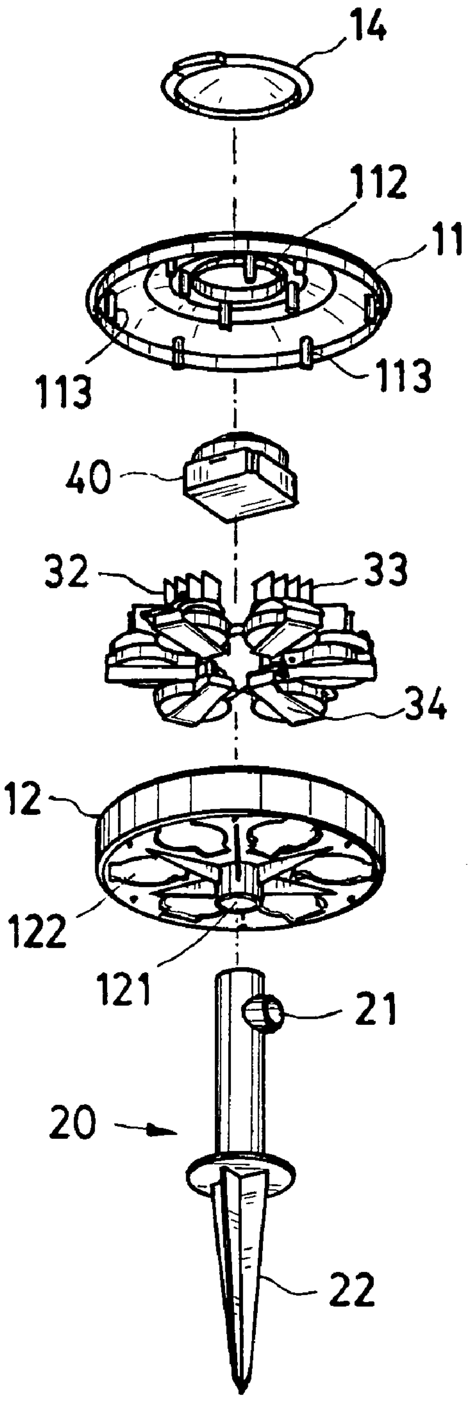
FIGS. 2(*a*)–(*b*) are exploded views of an electrical outlet stand with a control device according to the present invention.
Figure 2B:
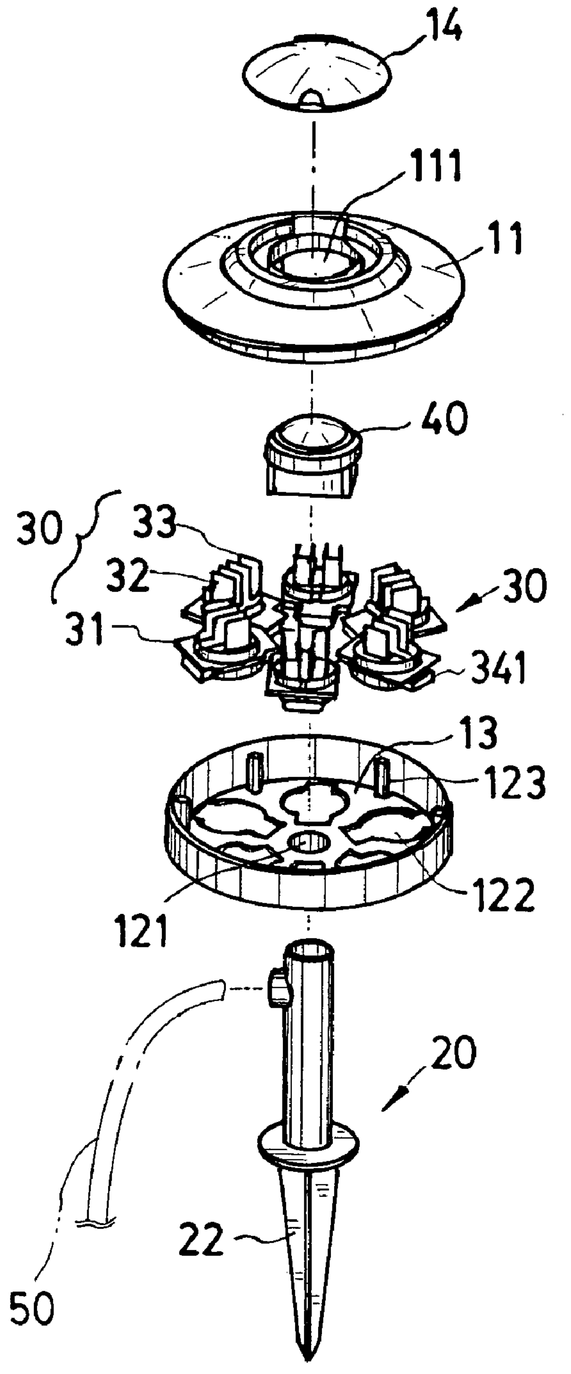

FIGS. 1(*a*)–2(*b*) illustrate an electrical outlet stand with a control device according to the present invention. The electrical outlet stand includes a housing 10, a support 20, a plurality of electrical outlets 30, and a control device 40. The electrical outlet stand with the control device can include a wire (or wires) inserted through an opening 21 of the support 20 and electrically connected to the control device 40 that is electrically connected to the plurality of electrical outlets 30 within the housing 10, so that an apparatus can be plugged into each of the plurality of electrical outlets 30. The support 20 includes a stake portion 22 for anchoring the electrical outlet stand in the ground.

The control device 40 is a timer module or a lighting module. The lighting module can be a dusk to dawn photo switch that turns the power on at dusk and off at dawn. The timer module controls each of the plurality of electrical outlets 30 by turning on and off power flowing thereto at a predetermined times. The timer module can be an electronic timer module or a mechanical timer module. The lighting module controls each of the plurality of electrical outlets 30 by turning on and off power flowing thereto at a predetermined times. The control device can include a lamp to provide lighting.

The housing 10 of the present invention has an upper housing 11 and a lower housing 12. The upper housing 11 is located above and covers the lower housing 12 forming a housing interior 13. The lower housing 12 includes a first opening 121 and at least one second opening 122. The upper housing 11 includes a fourth opening 111 and a cover 14. The cover 14 is preferably made of a transparent material and removably covers the fourth opening 111 to protect the wires 50 and the control device 40 within the housing interior 13, as well as provide access for setting and adjusting the control device 40 (for example the timer module and the lighting module). The upper housing 11 also includes a plurality of location poles 112 beneath and around the fourth opening 111 to which the control device 40 is connected. The upper housing 11 includes at least one assembly locking base 113 around an edge of the upper housing 11 and the lower housing 12 includes at least one assembly locking hole 123 around an edge of the lower housing 12 corresponding to the assembly locking base 113 to connect the upper housing 11 and the lower housing 12 with at least one screw (not shown). The at least one screw is inserted through each of the at least one assembly locking hole 123 into each of the at least one assembly locking base 113.

The support 20 is coupled to the lower housing 12 through the first opening 121 for anchoring the electrical outlet stand. The support 20 has a hollow-round shape and includes a third opening 21 positioned at one side into which the wire 50 is inserted. Wherein, the support 20 also includes a stake portion 22 for anchoring the device in the ground.

A preferred embodiment of the present invention includes six electrical outlets 30, but is not limited thereto. Each of the electrical outlets 30 is positioned inside the housing interior 13 and aligns with one of the second openings. Each of the plurality of electrical outlets 30 comprises a outlet base 31, a first contact portion 32, a second contact portion 33 and an outlet cover 34. The first contact portion 31 and the second contact portion 32 are connected to the wire 50 or control device 40.

The outlet cover 34 is positioned to extend outwardly from the outlet base 31 and be accessible from an exterior of the second opening 122 of the housing. The outlet cover 34 is flexibly connected at a first end to a first portion 341 of the outlet base 31 and removably connected at a second end to a second portion of the outlet base 31.

The control device 40 is positioned inside the housing interior 13 and electrically connected to and controls the electrical outlets 30, such that the control device 40 turns on and off power to the electrical outlets 30 at predetermined times. For example, when the control device 40 is a timer module, the timer module will cut off and turn on the power to the electrical outlets 30 when the predetermined times of the timer module 40 are reached.

The control device 40 can have an upper portion that has a round shape that aligns with and is inserted into the fourth opening 111 and a lower portion that is square for aligning with and connecting to the plurality of location poles 112 in the upper housing 11.

The wire(s) 50 is inserted through the third opening 21 and the first opening 121 and electrically connected to the control device 40, which is, in turn, electrically connected to the contact portions 32,33 of the electrical outlets 30. Electrical plugs of appliances can be connected to the outlets 30 to receive power.

The housing 10, the support 20, the outlet base 31, the outlet cover 34, and a housing of the control device 40 are made of an insulating material.

The description of the present invention has been presented for the purposes of illustration and description, but is not intended to be exhaustive or limited to the invention in the form disclosed. Many modifications and variations will be apparent to those of ordinary skill in the art. The embodiment was chosen and described to best explain the principles of the invention, the practical application, and to enable others of ordinary skill in the art to understand the invention for various embodiments with various modifications as suited to the particular use contemplated. While the invention has been described with reference to a preferred embodiment thereof, it is to be understood that modifications or variations may be easily made without departing from the spirit of this invention, which is defined by the appended claims.

What is claimed is:

1. An electrical outlet stand comprising:

a) a housing assembly having:

i) an upper housing; and ii) a lower housing having a first opening and at least one second opening, the upper housing being positioned above the lower housings, and bounding a housing interior located between the upper housing and the lower housing;

b) a support connected to the lower housing at the first opening and having a third opening;

c) at least one electrical outlet, each of the at least one electrical outlets being aligned with one of the second openings and having:

i) a outlet base;

ii) a first contact portion;

iii) a second contact portion; and iv) an outlet cover, d) a control device electrically connected to the first contact portion and the second contact portion of each of the electrical outlets; and e) a wire electrically connected to the control device, wherein: the upper housing includes a fourth opening: the control device is aligned with the fourth opening; the upper housing includes a plurality of location poles located on an edge of the fourth hole in the interior of the housing; and the control device is connected to the plurality of location poles.

2. The electrical outlet stand according to claim 1, wherein the wire extends through the third opening in the support and the first opening in the lower housing.

3. The electrical outlet stand according to claim 1, wherein in the outlet cover of each of the at least one outlet is located on an exterior of the housing in one of the second openings.

4. The electrical outlet stand according to claim 1, wherein the outlet cover is flexibly connected at a first end to a first portion of the outlet base and removably connected at a second end to a second portion of the outlet base.

5. The electrical outlet stand according to claim 1, wherein the housing, the support, the outlet base, the outlet cover, and a housing of the control device are made of an insulating material.

6. The electrical outlet stand according to claim 1, wherein the upper housing includes at least one assembly locking base located on an edge of the upper housing; the lower housing includes at least one assembly locking hole located on an edge of the lower housing aligning with the at least one assembly locking base, such that the upper housing and the lower housing are connected by at least one screw inserted through each of the at least one assembly locking hole into each of the at least one assembly locking base.

7. The electrical outlet stand according to claim 1, wherein the support has a hollow-round configuration and includes a stake portion.

8. The electrical outlet stand according to claim 1, further comprising a housing cover removably connected and sealing the fourth hole in the upper housing.

9. The electrical outlet stand according to claim 8, wherein the housing cover is made of a transparent material.

10. The electrical outlet stand according to claim 1, wherein the control device has a round upper portion and a square lower portion, the round upper portion is positioned in the fourth hole and the square lower portion is connected to the plurality of location poles.

11. The electrical outlet stand according to claim 1, wherein the control device is a timer module.

12. The electrical outlet stand according to claim 11, wherein the timer module is one of an electronic timer module and a mechanical timer module.

13. The electrical outlet stand according to claim 1, wherein the control device is a lighting module.

14. The electrical outlet stand according to claim 1, wherein the control device includes a lamp.

* * * * *